W. A. SHAW.
Shot Separator.
No. 2,910. Reissued April 7, 1868.
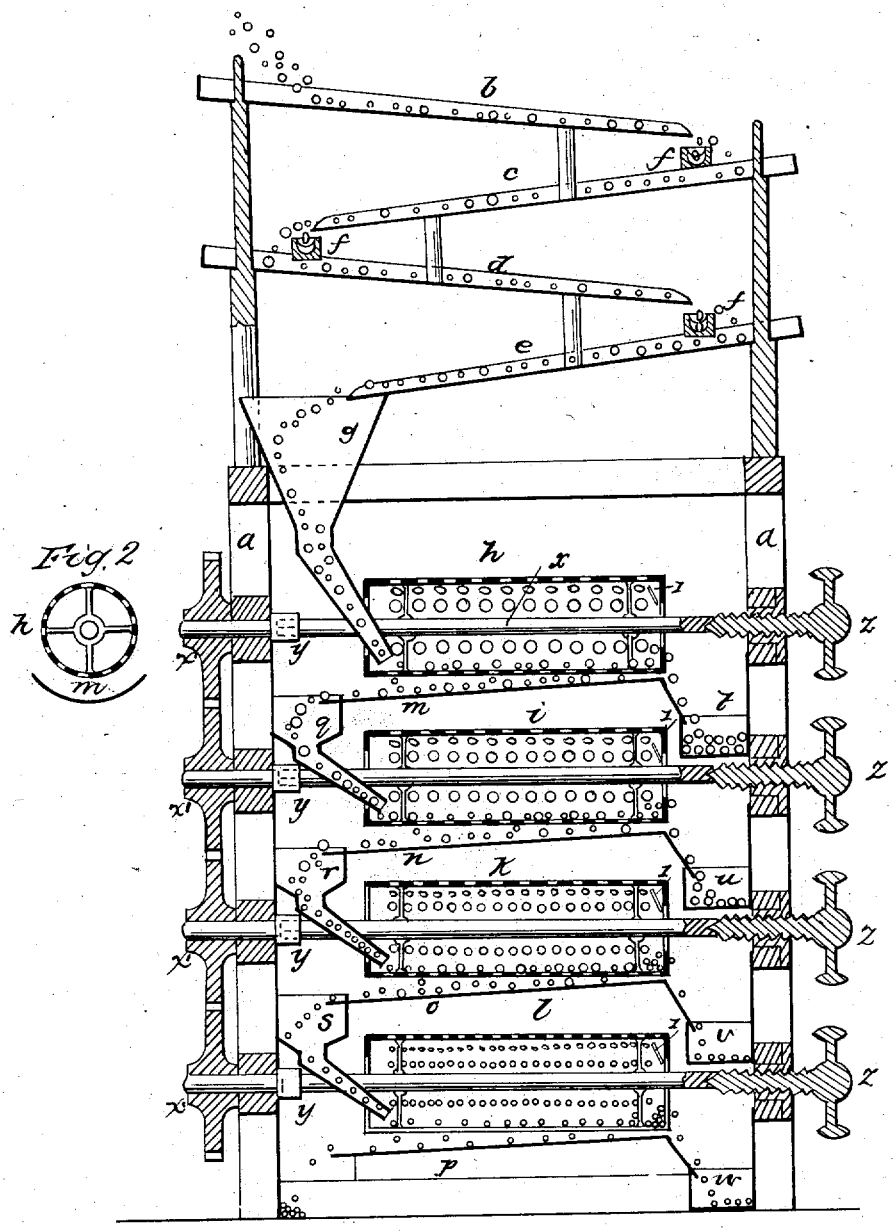
Witnesses
Chas. A. Smith
Jas. E. Serrell Jr.
Inventor
N. Anthony Shaw
N. PETERS, Photo-Lithographer, Washington, D. C.

United States Patent Office.

WILLIAM ANTHONY SHAW, GARDNER WILLARD, LEWIS COLWELL, AND JOSEPH COLWELL, ASSIGNEES OF WILLIAM ANTHONY SHAW, OF NEW YORK, N. Y.

*Letters Patent No.* 52,003, *dated January* 9, 1866; *reissue No.* 2,910, *dated April* 7, 1868.

APPARATUS FOR SEPARATING SHOT.

The Schedule referred to in these Letters Patent and making part of the same.

TO ALL WHOM IT MAY CONCERN:

Be it known that WILLIAM ANTHONY SHAW, of the city and State of New York, did invent, make, and applied to use a certain new and useful Improvement in the Art of Manufacturing Drop-Shot; and we do hereby declare the following to be a full, clear, and exact description of said invention, reference being had to the annexed drawing, making part of this specification, wherein—

Figure 1 is a vertical longitudinal section of the apparatus for separating and assorting the shot, and Figure 2 is a cross-section of one of the screening-cylinders and the trough below.

Similar parts are designated by the same letters.

In the manufacture of drop-shot it becomes necessary to separate the imperfect shot from those that are globular, and also to assort the globular shot according to their sizes.

These operations have usually been performed by costly hand-labor, and there has been no continuity in the operations, but a series of chargings and dischargings by hand. For instance, the shot as they are discharged from a rotary polisher, are taken, a scoopful at a time, and scattered on an inclined table, and the attendant, with a wide brush, sweeps them up the incline, then raising his brush, the globular shot roll down, and so he proceeds, until finally the imperfect shot are swept up over the highest edge of the incline into a receptacle.

The globular shot are next placed in a hopper, a given amount forming a charge. This hopper is upon a rocking frame containing drawers, with screen-bottoms to assort the sizes, and these drawers have to be emptied by hand from time to time into receptacles or bins.

The object of this invention is to produce a continuously-operating or automatic separater and assorter for shot or balls, whereby the shot have only to be supplied at the upper end of the machine, and from there they proceed onwards and downwards, and are separated, the imperfect ones being thrown out, and the globular ones being assorted according to size.

This is effected by a series of inclines, combined with transverse receptacles at their ends, said inclines being set in opposite directions, so that the momentum of the shot is checked in passing from one table to the other, and the transverse receptacles receive the imperfect shot, which, in consequence of not being true globes, do not roll with sufficient velocity to cause them to be projected over the said transverse receptacles; and from these separating-inclines the shot pass into and through separating and assorting-screens, the different sizes of shot being delivered into bins or receptacles provided for them.

In the drawing, *a* is a framework of suitable size, sustaining the inclined separating-planes *b c d e*. There may be more or less in number of these inclines, and they may be made adjustable in their inclinations.

These inclines are to stand at opposite inclinations, in order that the shot rolling off the lower end of one must stop, and thence commence to roll in the other direction on the next; this prevents the shot acquiring too great velocity, and also produces a pause, wherein an imperfect shot will turn upon its flattest side, and hence thereafter roll or slide more slowly than would be the case if the momentum were not checked.

Across the lower ends of the respective inclines are troughs or receptacles, *f*, placed with their upper edge in such a position, relatively to the edge of the incline, that those shot that are globular will, in rolling down, acquire a sufficient velocity to pass over this edge of the trough to the incline below, while those that are not globular, and hence acquire less velocity, fall into the receptacle or receptacles *f*, at some stage of the successive operations.

It is best to have the first inclines at a greater angle than the latter ones, in order that the angular pieces first separated may not remain on the first incline.

The shot are scattered upon the upper incline from the end of a spout or hopper, and pass from the bottom of the last incline into the hopper *g*, which conveys them to the first of a series of rotary screens, which screen, *h*, is formed cylindrically or slightly conical, and of perforated sheet metal or other material, set upon arms, from a removable shaft, *x*, at one end of which, is a square or socket, *y*, setting upon a similar coupling, that connects with a shot-shaft, rotated by the wheel *x'*, driven by competent power.

The shot that pass through the meshes of the sieve *h* fall on an incline, *m*, and roll into the next hopper, *q*, and pass into the next sieve, *i*, while those that remain within the sieve *h* are allowed to run out thereof into a receptacle, *t*, or an inclined bucket, 1, may be fitted within the sieve adjacent to the interior flange at the end, so as to lift the shot and throw them out over said flanged end into *t*. There is shown a series of these sieves or screens, *h i k l*, with corresponding inclines, *m n o p*, below them, conveying the shot to the hoppers *q r s*, respectively, while the shot that do not pass through the sieves are delivered in the assorted condition into the respective receptacles *t u v w*.

The screens *h i k l* may be sustained at the end opposite the couplings *y* by any suitable means. I have, however, shown pointed screws, *z z*, taking cavities in the ends of the shafts, respectively, in order that the screens may be removed with facility, and others, with different sizes of meshes, substituted, so as to suit the size of shot that is being assorted.

It is preferred that the top screens should have the largest meshes, so as to retain the largest shot, and let all the other shot pass through; but if the screen with the smallest meshes is placed at the top, the respective bins or receptacles *t u v w* will have to be placed where the hoppers *q r s* are shown, so that the shot retained in the screens will be emptied into the hoppers, while the smallest shot are taken off successively by the inclines *m n o p* below, to the respective receptacles.

From what has been above written, it will be seen that by means of this invention we separate the perfect from the imperfect shot, and that we separate the different sizes and deposit them in different places or receptacles, and that we do it automatically; that is to say, by the use of a machine which, being put and kept in motion, requires no other attention to enable it to do the work aforesaid, than what is necessary to supply it with the unassorted and imperfect shot.

It will be seen, too, that the contrivance used to separate the perfect from the imperfect shot may be employed apart from and independent of that used to separate the various sizes, the one being no necessary part of the other, but only an important adjunct, as either may be used independent of the other.

What we claim, therefore, as the invention of WILLIAM ANTHONY SHAW, and desire to secure by Letters Patent, is—

1. In the process of manufacturing shot, the use of an automatic apparatus so constructed and operated as to separate the perfect from the imperfect shot, and so as to assort the different sizes of shot and deposit them in separate places or receptacles, substantially as described.

2. Separating the perfect from the imperfect shot by the use of a series of inclined planes, so arranged and adjusted in respect to each other as to break one or more times the plane and direction of descent, and arrest in whole or in part the motion of the imperfect shot, for the purpose of changing its axis of motion, and thus gradually bring it to rest in receptacles at the foot of the various inclines, leaving the perfect shot only to descend to the bottom of the series of planes.

3. We claim a series of revolving screens for assorting the shot, in combination with the inclines and receptacles, substantially as specified.

In witness whereof, we have hereunto set our hands, this twenty-fourth day of December, A. D. 1866.

WM. ANTHONY SHAW,
GARDNER WILLARD,
LEWIS COLWELL,
JOSEPH COLWELL.

Witnesses:
JAMES T. WATERS,
A. R. CUSHMAN.